US006311553B1

(12) United States Patent
Schöffel et al.

(10) Patent No.: US 6,311,553 B1
(45) **Date of Patent: *Nov. 6, 2001**

(54) METHOD AND DEVICE FOR EXAMINING AND/OR ADJUSTING VALVES

(75) Inventors: Eberhard Schöffel, Bamberg; Josef Seidel, Breitengüssbach, both of (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,152

(22) PCT Filed: Sep. 17, 1997

(86) PCT No.: PCT/DE97/02081

§ 371 Date: Mar. 18, 1999

§ 102(e) Date: Mar. 18, 1999

(87) PCT Pub. No.: WO98/24014

PCT Pub. Date: Jun. 4, 1998

(30) Foreign Application Priority Data

Nov. 25, 1996 (DE) ............................................. 196 48 689

(51) Int. Cl.[7] .................................................. G01M 15/00

(52) U.S. Cl. ........................................................... 73/119 A

(58) Field of Search .................................. 73/119 A, 116, 73/117.2, 117.3, 118.1

(56) References Cited

U.S. PATENT DOCUMENTS

| | | | | |
|---|---|---|---|---|
| 3,704,694 | | 12/1972 | Heinz et al. . | |
| 4,254,653 | * | 3/1981 | Casey et al. | 73/119 A |
| 4,402,294 | * | 9/1983 | McHugh et al. | 73/119 A |
| 4,501,140 | * | 2/1985 | Nakagawa et al. | 73/119 A |
| 4,785,771 | * | 11/1988 | Ibuki et al. | 73/119 A |
| 4,791,810 | * | 12/1988 | Old et al. | 73/119 A |
| 4,798,084 | * | 1/1989 | Takahashi et al. | 73/119 A |
| 4,977,872 | * | 12/1990 | Hartopp | 73/119 A |
| 5,157,967 | * | 10/1992 | Wieczorek | 73/119 A |
| 5,492,099 | * | 2/1996 | Maddock | 73/119 A |
| 5,553,490 | * | 9/1996 | Nicholls et al. | 73/119 A |
| 5,641,891 | * | 6/1997 | Frankl et al. | 73/119 A |
| 5,650,575 | * | 7/1997 | Heyse et al. | 73/119 A |
| 5,708,201 | * | 1/1998 | Kaub | 73/119 A |
| 5,795,998 | * | 8/1998 | Smith | 73/119 A |
| 6,021,754 | * | 2/2000 | Kendrick . | |
| 6,085,142 | * | 7/2000 | Leo et al. | 73/119 A |

FOREIGN PATENT DOCUMENTS

| | | |
|---|---|---|
| 0 188 024 | 7/1986 | (EP) . |
| 0 426 205 | 5/1991 | (EP) . |

* cited by examiner

*Primary Examiner*—Eric S. McCall
(74) *Attorney, Agent, or Firm*—Kenyon & Kenyon

(57) ABSTRACT

A method and an apparatus for setting and/or testing valves, in particular injection valves of an internal combustion engine, are described. A defined activation signal is applied to a valve in order to determine a signal characterizing the flow rate of fuel. A gaseous medium is applied to the valve. A first variable which characterizes the flow rate of the gaseous medium, and/or a second variable, are detected.

10 Claims, 3 Drawing Sheets

METHOD AND DEVICE FOR EXAMINING AND/OR ADJUSTING VALVES

FIELD OF THE INVENTION

The present invention relates to a method and an apparatus for setting and/or testing valves.

BACKGROUND INFORMATION

Methods for setting and/or testing valves, in particular injection valves for internal combustion engines, are known in the art. To set the dynamic flow rate of injection valves, the hydraulic flow volume is measured and set during manufacture.

When the dynamic flow rate of valves is set, a highly accurate hydraulic medium ("standard gasoline") is applied to the valve. The actual flow rate is measured by defined activation and measurement of the flow rate, and the valve is set so that a defined flow rate is established for a defined activation.

The standard gasoline has a constant density and viscosity as well as high purity. For these reasons, this standard gasoline is very expensive. In additions evaporation of the standard gasoline results in a considerable impact on the environment and on shop personnel. The use of other media for testing is problematic, since they have hydraulic characteristics which differ from those of fuel.

SUMMARY OF THE INVENTION

An object of the present invention is to provide for a method and an apparatus for testing and/or setting a valve that decreases costs and environmental impact.

In the procedure according to the present invention, a gaseous medium is applied to the valve. In this context, a first variable characterizing the flow rate of the gaseous medium, and/or at least a second variable, are detected. This procedure can result in a considerable cost reduction and a decrease in the impact on the environment and on shop personnel.

It is particularly advantageous if the current at which the valve opens and/or the current at which the valve closes is detected as the second variable.

DETAILED DESCRIPTION OF THE INVENTION

Figure 1:
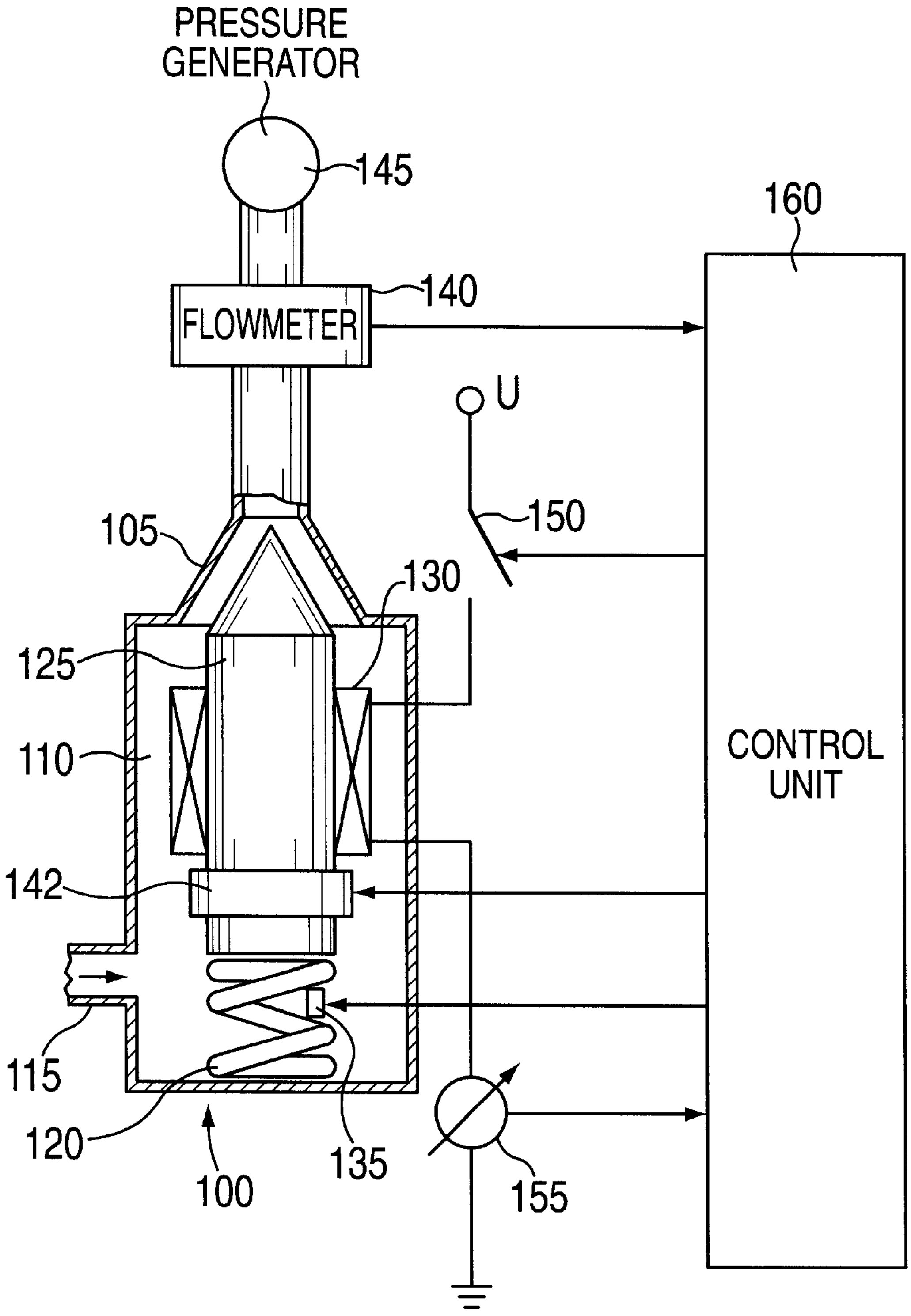
FIG. 1 shows an apparatus according to the present invention.

FIG. 1 depicts the apparatus according to the present invention in highly schematic form. A solenoid valve 100 is shown in a simplified depiction. Said solenoid valve possesses a valve seat 105 and a valve chamber 110. In normal operation, fuel passes through an inlet 115 into valve chamber 110. A spring is designated 120, and a valve needle 125. A coil 130 is provided to move the valve needle. Also provided are means 135 for adjusting the spring force, and a means 140 for setting the linear travel of solenoid valve needle 125. The outlet of the valve communicates via a flowmeter 140 with a pressure generator 145.

A supply voltage U is applied, via a switching means 150, to coil 130. The second terminal of coil 130 is connected to ground via a current measuring means 155.

A control unit 160 is also provided. Said control unit 160 applies signals to switching means 150, processes the output signals of flowmeter 140 and current measuring means 155, and, in a preferred exemplary embodiment, also applies corresponding variables to setting means 142 and 135.

In the zero-current state, spring 120 presses valve needle 125 into valve seat 105. In this zero-current state, the valve interrupts the communication between inlet 115 and the outlet. The application of current to coil 130 causes application of a magnetic force which acts against the spring force or mechanical force. The result of this force is that valve needle 125 lifts off from valve seat 105. The distance between valve seat 105 and valve needle 125 is referred to as linear travel H.

The procedure according to the present invention is not limited to this type of valve. It can also be used in other controlled valves in which a specific volume is released by using an activation signal. For example, the procedure can also be used in valves which are held in their open state by a spring, and which enable flow in their zero-current state.

When a defined voltage, i.e. by an activation signal of a fixed length, is applied to the solenoid valve, the solenoid valve must enable flow with a specific linear travel H. The volume that flows through the valve during activation depends on several factors. One of these is the rapidity with which the solenoid valve opens, i.e. the speed at which the linear travel rises from zero to the maximum value. This variable determines the dynamic flow rate of the solenoid valve. The latter depends substantially on spring 120. This speed can be set with setting means 135. With setting means 135, it is possible to set the dynamic flow rate.

In addition, the linear travel which is established after a certain time at a specific activation current is different for different injection valves. A setting apparatus 142 is therefore provided, with which the linear travel can be set, in the static state, to a definable value. For this, current is continuously applied to the solenoid valve, the static flow rate is measured, and setting device 142 is set so as to establish a specific desired static flow rate.

These setting operations are usually performed with fuel, in particular with a highly accurate hydraulic medium. Heptane is preferably used for this. The use of this hydrocarbon is problematic for various reasons.

It has been recognized, according to the present invention, that the dynamic flow rate can also be performed using compressed air.

The behavior of valves when dynamically activated is substantially determined by the length of the activation pulse (activation pulse duration) as compared with the pulse period, by the static flow rate, and by the change over time in the difference between the mechanical and magnetic forces.

The activation pulse duration corresponds to the time during which current is being applied to the valve coil. The pulse period corresponds to the total time during which current is and is not being applied to the valve. The static flow rate is the volume which flows through the completely opened valve during a specific time period. The dynamic flow rate is the volume which flows through the valve during a specific time period when it is activated at a specific pulse duty rate. The pulse duty rate is defined as the ratio between the activation pulse duration and the pulse period. The values for dynamic and static flow rate are generally different for fuel and for gaseous substances.

According to the present invention, it has been recognized that the change over time in the difference between the magnetic force and the mechanical force, together with the dynamic flow rate of fuel, can be detected by measuring the pneumatic dynamic flow rate QPN.

The pneumatic dynamic flow rate QPN is understood to mean the volume of gas which flows through the valve at a given pulse duty rate.

According to the present invention, differences between individual solenoid valves, which are based in particular on differences in the magnetic circuit, are detected by measuring the static starting current and release current.

The three parameters which are pneumatic dynamic flow rate QPN, starting current IAN, and release current IAB can be measured in simple fashion. On the basis of these variables, which are measured with a gaseous medium, conclusions are drawn as to the dynamic flow rate for fuel QK. For this, the flow rate for fuel is measured on a small number of valves, in particular from pre-production runs. The three parameters—pneumatic dynamic flow rate QPN, starting current IAN, and release current IAB—are then detected, and corresponding conversion factors are determined.

Elimination of the hydraulic medium in the determination of the dynamic fuel flow rate is advantageous because atmospheric air, which is easily available and extremely environmentally compatible, can be used as the gaseous medium for measuring the flow rate. Slow and expensive hydraulic volume measurement is replaced by faster and cheaper pneumatic flow rate measurement. The measurement of the static starting and release currents is performed using of a simple measurement and indication method.

The starting current IAN, release current IAB, and pneumatic dynamic flow rate QPN parameters are highly dependent on the fuel flow rate, and can be determined very easily and quickly in full-scale production.

The device depicted in FIG. 1 is suitable for this purpose. Pressure generator 145 generates a definable pressure which is applied to the outlet of the solenoid valve. Flow rate measuring means 140 is arranged between the pressure generator and the outlet of the valve. A metering orifice is preferably used as pressure measuring means 140. The measurement is thus accomplished by applying to the valve, in a direction opposite to the normal flow direction, a pneumatic pressure which preferably assumes values of approximately 600 millibar.

To measure a first variable which indicates the pneumatic dynamic flow rate and characterizes the flow rate of the gaseous medium, a defined pulse duty rate is applied to coil 130. For example, current is applied to the coil for 3 milliseconds, the period, i.e. the spacing between the beginnings of two successive current applications, being 6 milliseconds. In this example the activation frequency is 166.7 Hz.

With this type of activation, the solenoid valve opens and closes at this frequency. With this dynamic activation, the magnetic force has a considerable influence on the pneumatic dynamic flow rate. Fast opening results in a large flow volume, while slow opening, due to a large spring force, results in a small flow volume.

A second variable, referred to as the starting current IAN and/or the release current IAB, is also detected. For this, the voltage U applied to coil 130 is gradually increased. At the same time, the coil current is detected using current measuring means 155. Opening of the injection valve is recognized when the flow rate suddenly rises. This is recognized by way of a pressure drop in the region of pressure generator 145 or flow rate measuring means 140. The pressure drop is on the order of 25 mbar.

The voltage is then reduced, and the time at which the valve closes again is determined. The current at which the solenoid valve opens is referred to as the starting current IAN, and the current at which the solenoid closes is referred to as the release current IAB.

These measurements can be performed automatically by control unit 160, manually, or semiautomatically. For example, provision can be made for the measurement and the setting of the valve to be performed automatically by control unit 160. It is also possible, however, for control unit 160 to perform the measurements, and for setting to be accomplished manually. It is even possible to work without a control unit. This means that activation signals are applied to the valve with a suitable signal generator, and the measurement and settings are performed manually.

According to the present invention, it has been recognized that there is a fixed relationship between the dynamic flow rate for fuel QK and the pneumatic dynamic flow rate QPN, the starting current IAN, and the release current IAB. This relationship is governed by the following formula:

$$QK-A\times B*IAN-C*IAB+D*QPN$$

Terms A, B, C, and D are constants which must be determined for a few examples of injection valves of identical design. For this, the dynamic flow rate for fuel QK and the starting current IAN, release current IAB, and pneumatic dynamic flow rate QPN are measured, using compressed air and identical activation signals, on a few valves of identical design. Conversion factors A, B, C, and D can be determined on the basis of these measured values. Variables A, B, and C are of similar magnitude, while term D is substantially smaller.

Figure 2:
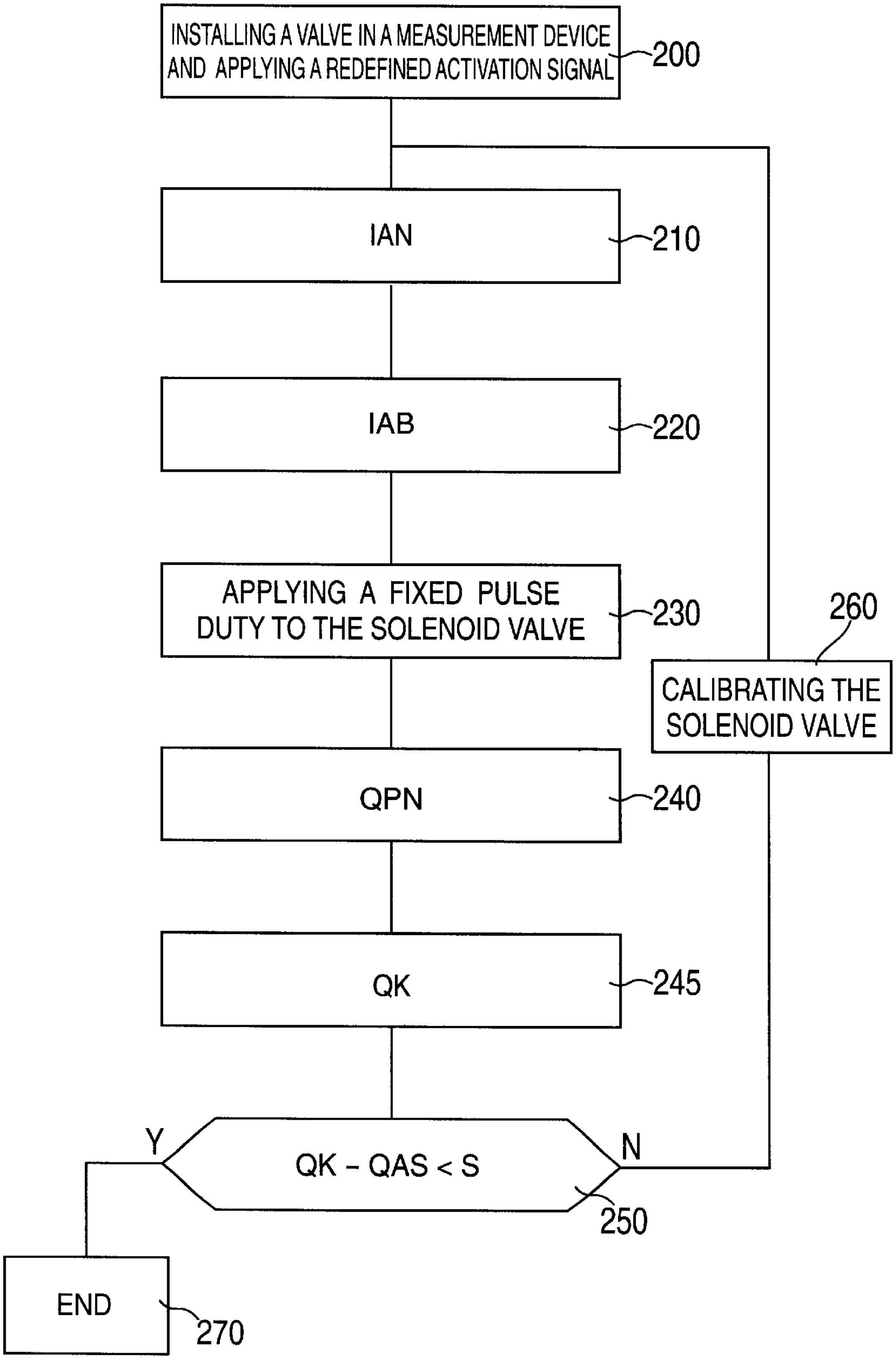
FIG. 2 shows a flow chart of a method according to the present invention.

FIG. 2 depicts the procedure according to the present invention for setting the valve, with reference to a flow chart. In a first step 200, the valve is installed in the measurement device and a defined activation signal is applied to it. It can be installed in the normal valve flow direction, or opposite to that direction. Starting current IAN is measured in step 210, and release current IAB in step 220. The measurement of these two first variables is depicted in more detail in FIG. 3.

In the subsequent step 230, a fixed pulse duty rate is applied to the solenoid valve. This is followed, in step 240, by measurement of a first variable, referred to as the pneumatic dynamic flow rate QPN, by means of flowmeter 140.

On the basis of these three parameters, the dynamic flow rate for fuel QK is then determined in step 245 using the formula indicated above. Query 250 checks whether said value QK deviates from an expected setpoint QKS. This is done, for example, by checking whether the difference between the dynamic flow rate for fuel QK and the expected setpoint QKS is less than a threshold value S. If so, the injection valve is set correctly and the testing and setting operation ends at step 270.

If the fuel flow rate value QK calculated in this fashion deviates from the expected value QKS, the solenoid valve is then calibrated in step 260. This is done by suitably influencing setting means 135 and/or 142. Steps 210 to 250 are then performed again.

In a particularly advantageous exemplary embodiment, the target values for variables QPN, IAN, and IAB are predetermined using a few valves. Here the calculation in step 245 can be omitted. In step 250, the values QPN, IAN, and/or IAB are then compared with the corresponding expected values. With this exemplary embodiment a valve calibration occurs if there is a discrepancy between the first variable and a definable setpoint for the first variable, and/or if there is a discrepancy between the second variable and a definable setpoint for the second variable.

One pneumatic and two electrical variables are used to set the hydraulic properties of the valve. These variables can be measured easily and quickly. On the basis of these measured variables, a hydraulic variable is determined and the calibration means are set so that the hydraulic variable corresponds to an expected setpoint. Prior to the measurement, factors A, B, C, and D must be determined on a small number of valves by measuring with fuel and with air. Most of the valves are then tested and set with air only.

Figure 3:
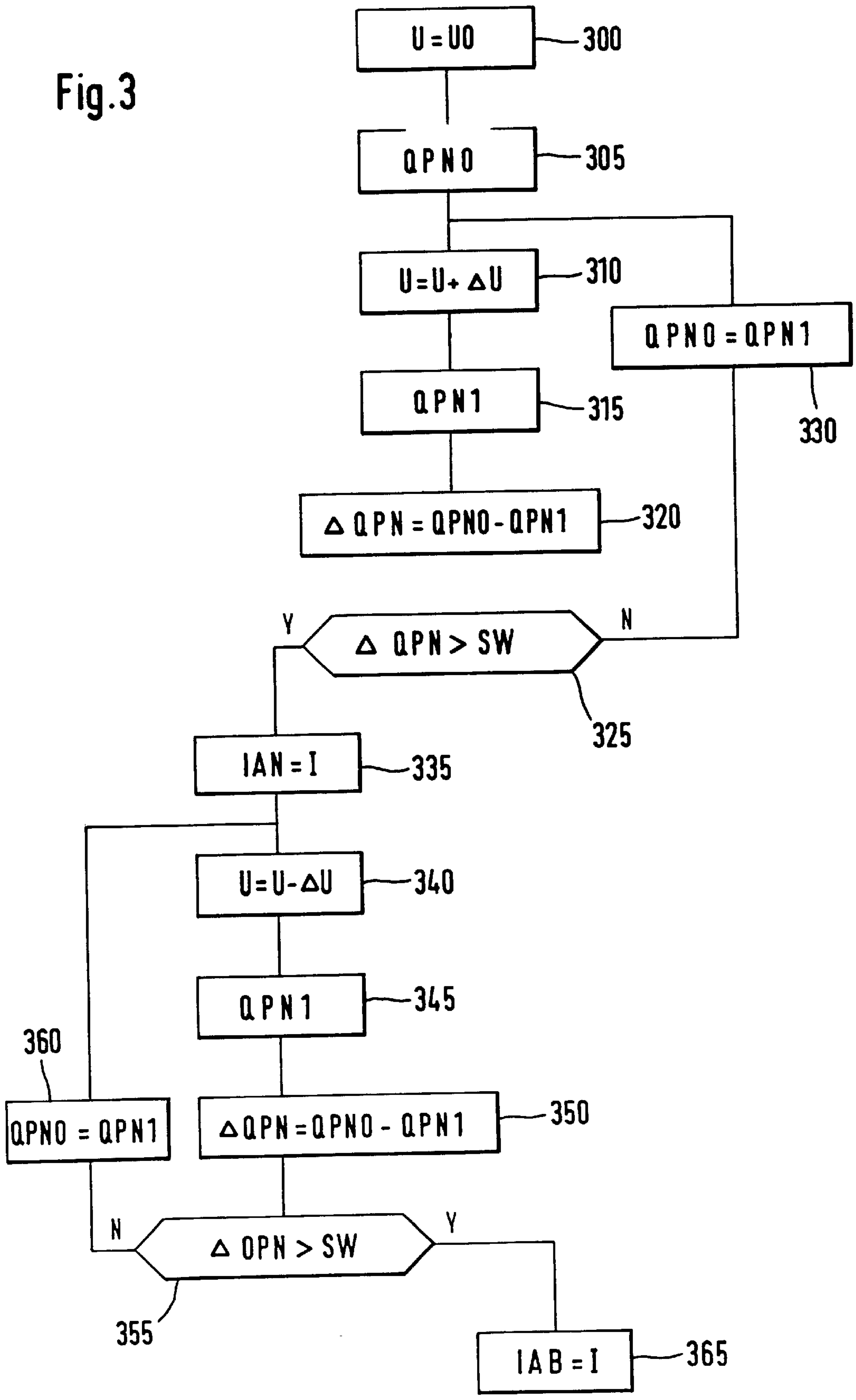
FIG. 3 shows another flow chart of the method according to the present invention.

The procedure for measuring the electrical variables is, for example, as depicted in FIG. 3 as a flow chart. In a first step 300, a voltage value U0 is defined. This voltage value is selected so that very little or no current is flowing, so that the solenoid valve definitely has not yet opened. Then in step 305 the pneumatic flow rate QPN0 is detected. Then in step 310 the voltage value U is incremented by a defined value $\Delta$ U. Then in step 315 the new pneumatic flow rate value QPN1 is measured.

Then in step 320 the difference $\Delta$ QPN between the old and new values for the pneumatic flow rate is determined. The subsequent query 325 checks whether that value is greater than a threshold value. If not, i.e. if the pressure has not dropped and the solenoid valve needle has not yet lifted off, then in step 330 the old value QPN0 is replaced by the new value QPN1, and the voltage value is again incremented in step 310.

If query 325 recognizes that the pressure has dropped and the flow rate has risen, valve needle 125 has therefore lifted off and starting current IAN has been reached. In step 335, the instantaneous current I is therefore measured by current measuring means 155 and stored as the starting current IAN. To detect the starting current, the current is incremented in ramped fashion at a constant slope of, for example, 0.001 milliampere per millisecond. The pneumatic flow rate QPN is continuously monitored to determine when the starting current has been reached. The procedure for the release current IAB is analogous. In step 340 the voltage U is decremented by a definable value $\Delta$ U. In step 345 the new flow rate value QPN1 is measured, and in step 350 is compared with the old value QPN0.

If query 355 recognizes, based on the difference $\Delta$ QPN resulting from comparison with a threshold value SW, that the flow rate has not decreased, i.e. the valve needle has not yet moved, step 360 is then performed, in which the old value is overwritten by the new value, and then in step 340 the voltage is reduced further. When query 355 recognizes a drop in the flow rate, then in step 365 the instantaneous current I is detected and stored as the release current IAB.

The values of 5 milliseconds for the activation time and 10 milliseconds for the pulse duty rate are selected as examples only. These values are chosen to be as small as possible, since the result is a better correlation between the hydraulic and pneumatic flow rates. Conversion of the parameters IAN, IAB, and QPN, via the correlation, into a hydraulic flow rate is accomplished automatically in control unit 160, so that fuel values can be used directly as target values to be set.

Other gaseous substances can also be used instead of air.

What is claimed is:

1. A method for calibrating a valve, comprising the steps of:

providing a predetermined activation signal to the valve;

providing a gaseous medium to the valve;

detecting at least one of a first variable and a second variable when the gaseous medium is provided to the valve, wherein the first variable is indicative of a flow rate of the gaseous medium, and wherein the second variable is indicative of a value of a current controlling at least one of opening and closing the valve;

determining a particular signal from the at least one of the first variable and the second variable, wherein the particular signal is indicative of a flow rate of a fuel; and if a value of the particular signal is not equal to a predetermined setpoint, calibrating the valve and repeating the foregoing steps.

2. The method according to claim 1, wherein the valve is an injection valve of an internal combustion engine.

3. The method according to claim 1, wherein the second variable is indicative of at least one of the first current and a second current, the first current opening the valve and the second current closing the valve.

4. The method according to claim 1, wherein the first variable is indicative of the pneumatic dynamic flow rate.

5. The method according to claim 1, further comprising the step of:

determining the particular signal as a function of the first variable and the second variable.

6. A method for calibrating a valve, comprising the steps of:

providing a predetermined activation signal to the valve;

providing a gaseous medium to the valve;

detecting at least one of a first variable and a second variable when the gaseous medium is provided to the valve, wherein the first variable is indicative of a flow rate of the gaseous medium, and wherein the second variable is indicative of a value of a current controlling at least one of opening and closing the valve; and if at least one of the first variable and the second variable is not equal to a first predetermined setpoint associated with the first variable or a second predetermined setpoint associated with the second variable, then calibrating the valve.

7. The method according to claim 1, wherein the flow rate of the fuel includes a dynamic flow rate.

8. The method according to claim 1, wherein the gaseous medium includes a compressed air.

9. An apparatus for calibrating a valve, comprising:

a first arrangement providing a predetermined activation signal to the valve;

a second arrangement providing a gaseous medium to the valve;

a third arrangement detecting at least one of a first variable and a second variable when the gaseous medium is provided to the valve, wherein the first variable is indicative of a flow rate of the gaseous medium and wherein the second variable is indicative of a value of a current controlling at least one of opening and closing the valve;

wherein the first arrangement determines a particular signal from the at least one of the first variable and the second variable, and wherein the particular signal is indicative of a flow rate of a fuel; and a fourth arrangement determining whether the value of the particular signal is equal to a predetermined setpoint and identifying that the valve requires calibration.

10. The apparatus according to claim 9, wherein the valve is an injection valve of an internal combustion engine.

* * * * *